(12) United States Patent
Grasso et al.

(10) Patent No.: US 6,764,787 B2
(45) Date of Patent: Jul. 20, 2004

(54) ONE PIECE SLEEVE GAS MANIFOLD FOR CELL STACK ASSEMBLIES SUCH AS FUEL CELLS

(75) Inventors: Albert P. Grasso, Vernon, CT (US); Henry G. Johnson, Cobalt, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 72 days.

(21) Appl. No.: 10/241,221

(22) Filed: Sep. 10, 2002

(65) Prior Publication Data

US 2004/0048136 A1 Mar. 11, 2004

(51) Int. Cl.⁷ .................. H01M 8/02; H01M 8/04; C25B 9/00; B01D 53/22; F28F 3/10
(52) U.S. Cl. .................. 429/38; 429/34; 429/35; 429/37; 204/257; 204/269; 204/278.5; 96/7; 165/166
(58) Field of Search .................. 429/32, 34–36, 429/37, 38; 204/255–258, 263, 265, 266, 269, 270, 275.1, 277, 278, 278.5; 95/52; 96/7; 165/166, 167

(56) References Cited

U.S. PATENT DOCUMENTS

| 4,761,349 A | * | 8/1988 | McPheeters et al. .......... 429/39 |
| 6,264,807 B1 | * | 7/2001 | Fenner et al. ................ 204/252 |
| 2002/0185266 A1 | * | 12/2002 | Dobbs et al. ................ 165/166 |

* cited by examiner

Primary Examiner—Bruce F. Bell
Assistant Examiner—Jonathan Crepeau
(74) Attorney, Agent, or Firm—M. P. Williams

(57) ABSTRACT

A stack of plates (121) (such as fuel cells, electrochemical cells, or enthalpy exchange plates) is surrounded by a sleeve manifold (119) which is shaped to provide manifold chambers (34–39; 146–149; 151–153; 156–158; 161–163; 180–187), and including surfaces (142) for seals (143) to isolate the manifold chambers from each other. Sleeve manifolds (119a, 119b, 119c) may be formed of material of varying thickness, by machining, casting, or extrusion, or may be formed of material (119d) of uniform thickness by bending, casting or extrusion. Sleeve manifolds may be formed of metal, graphite, plastic or reinforced plastic.

15 Claims, 6 Drawing Sheets

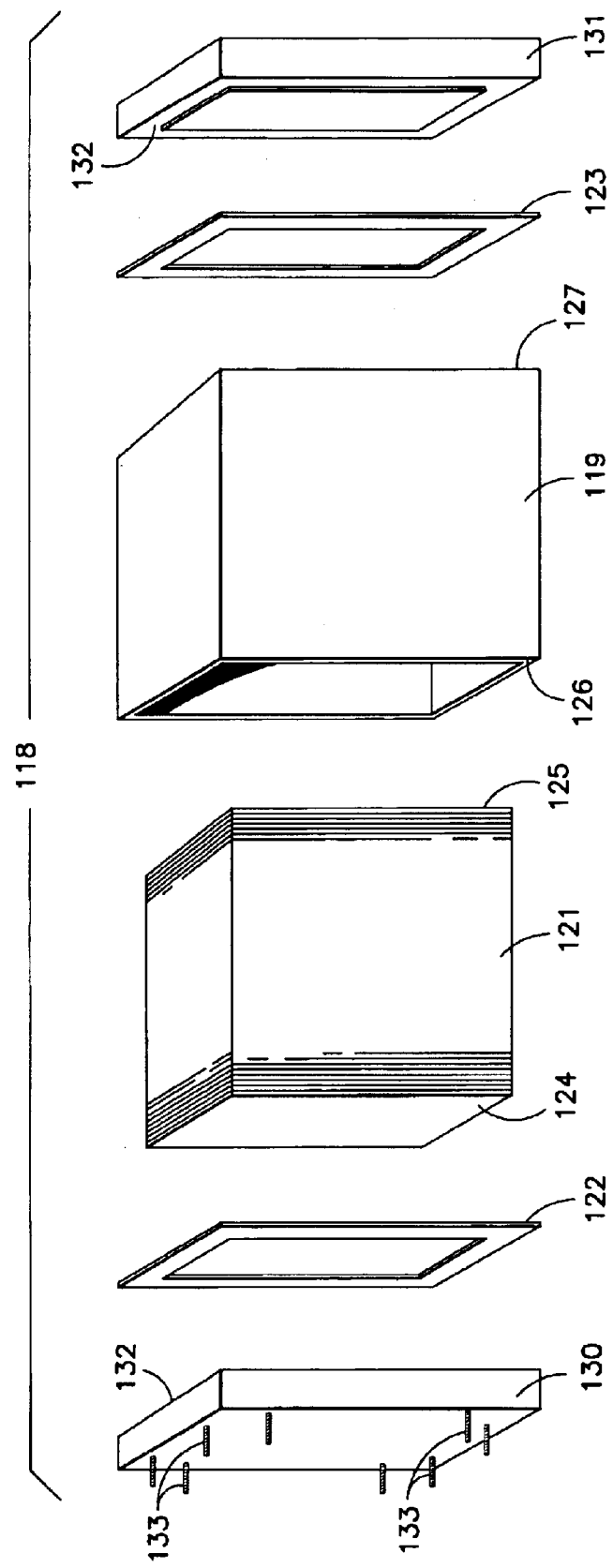

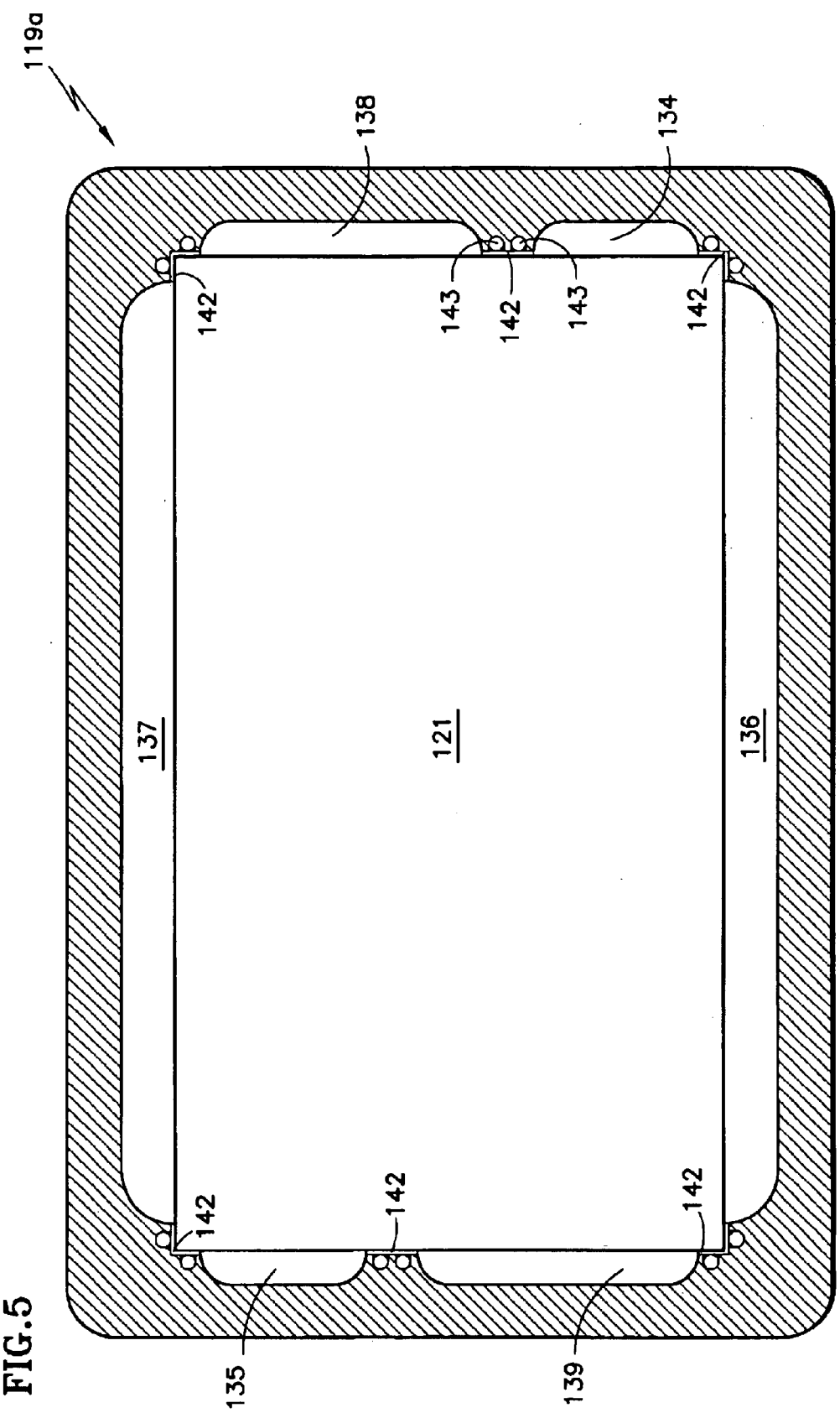

ONE PIECE SLEEVE GAS MANIFOLD FOR CELL STACK ASSEMBLIES SUCH AS FUEL CELLS

TECHNICAL FIELD

This invention relates to a single-piece sleeve manifold which will supply, contain and remove fluids, including fuel reactant gases, oxidant reactant gases, and cooling fluids, in fuel cell stack assemblies, electrochemical cell stack assemblies, and including exchange gases in enthalpy exchange devices.

BACKGROUND ART

In cell stack assemblies, it is known to use internal reactant and coolant manifolds as well as external coolant and reactant manifolds. Internal manifolds generally comprise passageways made within the various plates that constitute the cells of the cell stack assemblies. This renders the plates themselves much more expensive than plates which are fabricated for use with external manifolds. Internal manifolds have potential leakage paths between the plates of every cell, the leakage thereby being to the external environment. While external manifolds may also leak gases to the external environment, the avoidance of such leaks is more easily accomplished. Internal manifolds are generally smaller in cross-section than external manifolds and are better suited for pure reactants (like pure hydrogen) and high reactant operating pressures.

External manifolds consist of manifold shells, manifold seal gaskets, and a mechanical loading or restraint system to hold the manifolds in compression, tightly against the edges of the cell stack.

A fuel cell module 10 of U.S. Pat. No. 4,345,009, shown in FIG. 1 and in cross section in FIG. 2, is one example of the manifold and containment systems known in the art. The lower right corner of FIG. 2 is the corner of the module 10 pointing toward the viewer in FIG. 1. The module 10 includes a stack 12 of fuel cells 14. As shown in FIG. 3, each fuel cell 14 comprises a gas porous anode electrode 16 and a gas-porous cathode electrode 18 spaced apart with a layer 20, such as a liquid electrolyte retaining matrix or a proton exchange membrane, disposed therebetween. Each electrode 16, 18 includes a very thin catalyst layer 19, 21, respectively, on the surface thereof adjacent the layer 20. An electrically conductive, gas impervious plate 22 may separate adjacent fuel cells in the stack 12. Each fuel cell in the stack may include one separator plate 22 such that the phrase "fuel cell" will encompass a repeating unit of the stack which includes one separator plate. The fuel cells of this exemplary embodiment may be the same as shown in U.S. Pat. No. 4,115,627 in which the electrolyte is phosphoric acid. However, fuel cell stacks with proton exchange membrane electrolytes, as in U.S. Pat. No. 6,024,848, have similar manifold and restraint problems.

In this embodiment every third fuel cell 14' (FIG. 3) includes a coolant carrying layer 24 disposed between the electrode 16 and the separator plate 22. Passing in-plane through this layer 24 are coolant carrying passages 26. The coolant flowing through these passages carries away the heat generated by the fuel cells. The number of coolant layers 24 and passages 26 required by a stack is dictated by a variety of factors which are not relevant here. Although the coolant passages 26 are shown as extending to the surface 32 for clarity, in an actual fuel cell stack they would not do so. The stack 14 is completed by top and bottom flat graphite current collector blocks 27, 28, respectively, bonded to the separator plates 22 at each end of the stack, and pressure plates 66, 68.

As shown in the drawing, the outer edges 29 of the stack components 16, 18, 20, 22, 24, 27 and 28 form four outwardly facing planar surfaces which are the external surfaces of the stack 12. Portions of two of these surfaces 30, 32 are shown in FIG. 3. Each of the four surfaces is substantially completely covered by a reactant gas manifold. An air or oxygen gas inlet manifold 34 covers the surface 30 while a fuel or hydrogen gas inlet manifold 36 covers the surface 32. The opposing surfaces are covered by an air outlet manifold 38 and a fuel outlet manifold 40 (FIG. 2).

The manifolding arrangement just described incorporates an outlet manifold on each side of the stack opposite an inlet manifold. However, as shown in U.S. Pat. No. 3,994,748 a fuel manifold covering one surface of the stack may be divided into two compartments to serve as both the inlet and outlet manifold, while the manifold on the opposite surface of the stack serves as a mixing manifold; the same configuration may be used for the air.

The anode electrode 16 and the cathode electrode 18 both comprise relatively thick substrates with ribs formed on one side thereof defining reactant gas channels 42, 44, respectively. The fuel gas channels 42 carry hydrogen or a hydrogen-rich gas across the cells from the fuel inlet manifold 36 to the fuel outlet manifold 40. The air channels 44 carry air across the cells from the air inlet manifold 34 to the air outlet manifold 38. The flat surface of each substrate, which is opposite to the surface having the ribs (and thus the gas channels), has a layer 19, 21 of catalyst disposed thereon.

The graphite blocks 27, 28 have the same outer dimensions as the other stack components, and their outwardly facing surfaces (two of which, 50 and 52, can be seen in FIG. 3) provide smooth sealing surface for the top and bottom sealing flanges 54, 56 of each manifold. A thick block at one end of the stack is required to accommodate the possible differences in stack height which could result from the buildup of the very small tolerances in the thickness of the many hundreds of components in the stack 12. For example, a stack of 400 cells each having a thickness of about 0.64 cm (0.25 inch) with a tolerance of 0.01 cm (±0.004 inch) could have an overall height of anywhere from 250 to 258 cm (98.4 to 101.6 inches). The manifolds, on the other hand, have a fixed height. A large block thickness is thus required to ensure that both the top and bottom flanges 54, 56 are located somewhere on the smooth sealing surfaces of the blocks 27, 28 after the desired compressive force has been applied to the stack as hereinafter explained.

As best shown in FIG. 2, side flanges 58, seal against the vertically extending external surfaces of the stack 12 near the corners of the stack which do not have reactant gas channels. A sealing material, such as a porous polytetrafluoroethylene, is disposed between the manifold flanges 54, 58 and the surfaces of the stack. Steel bands 60 (FIGS. 1 and 2) surround the stack manifolds and hold them in sealing relationship with the stack and graphite blocks. Fasteners 62 connecting the ends of each band permit tightening the bands to the extent necessary to ensure adequate sealing.

To obtain good electrical, thermal, and sealing contact between the various components of the cells and the stack 12, the module 10 includes a constraint system 64. In this exemplary embodiment, the constraint system 64 comprises inflexible top and bottom steel end or pressure plates 66, 68, respectively, and tie rods 70 connecting the plates. The plates 66, 68 rest flat against the graphite blocks 27, 28, respectively. In assembling a module 10, the pressure plates 66, 68, the blocks 48, 49, and the various stack components are arranged one atop the other in proper sequence. This assembly is hydraulically loaded whereupon a preselected axial (i.e., perpendicular to the plane of the cells) load is applied to the plates 66, 68 to compress the stack 12. The tie bolts 70 are then tightened down to an extent that, when the assembly is removed from the press, the compressive force on the stack 12 is of approximately the desired magnitude. The manifolds 34, 36, 38 and 40 are then positioned against the sides of the stack and secured by the bands 60.

Since the constraint system 64 and the manifolds 34, 36, 38 and 40 are made from similar materials (carbon steel) they have the same or approximately the same coefficient of thermal expansion. Therefore, when the stacks heat up during operation these items expand to approximately the same extent. Although the stack 12 has a lower coefficient of thermal expansion, as the plates 66, 68 move apart the elasticity or spring rate of the compressed stack results in the height of the stack increasing by the same rate with an accompanying loss in axial load. Thus, there is virtually no relative movement between the graphite blocks 27, 28 and their respective manifold sealing flanges 54, 56 during thermal expansion. Likewise, there is relatively little motion between the stack external surfaces, such as 30 and 32, and the vertical manifold sealing flanges 58. Once steady state is reached the constraint system holds the stack height constant.

The external manifold system described with respect to FIGS. 1–3 presents difficulty in assuring the lack of leakage to the external environment, is comprised of many extensive components, and assembly thereof is extremely expensive. The leakage of fuels, such as hydrogen, in prior art fuel cell stack assembly designs may be too great for use in vehicles and residential applications. However, the use of external manifolds, particularly for low-pressure applications with dilute reactants, such as air and a reformed hydrocarbon fuel, is advantageous.

DISCLOSURE OF INVENTION

Objects of the invention include improvements in supplying fluids to, containing fluids in, and removing fluids from a plurality of cells assembled into a stack, such as fuel cells, electrochemical cells, and enthalpy exchange devices. Other objects of the invention include: reduction of leakage, simplification of assembly, and reduction of costs in such cell stack assemblies; improved cell stack gas manifolds; and improved manifold seals and constraint.

According to the present invention, a single piece sleeve manifold for a cell stack assembly is shaped so that when deployed on a cell stack, the shaping of the sleeve manifold of the invention provides coolant fluid and/or reactant gas manifold chambers for the delivery and removal of fluids from the cell stack. According further to the invention, a sleeve manifold for a cell stack may comprise a rectangular prism, or oblate cylindroid, with additional spatial characteristics so as to define the reactant gas and coolant fluid manifolds where required. In still further accord with the invention, sleeve manifolds may consist basically of material having non-uniform thickness, including cutouts to define manifolds, or it may comprise material of a uniform thickness shaped so as to form the manifold chambers. The sleeve manifolds of the invention may be comprised of suitable materials, including sheet metal, extruded metal or plastic, machined metal or plastic, and cast or machined graphite.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 4 is an exploded, schematic, perspective view of a simplified, stylized cell stack employing a sleeve manifold of the present invention.

FIG. 5 is a sectioned, end elevation view of a first embodiment of a sleeve manifold according to the present invention.

MODE(S) FOR CARRYING OUT THE INVENTION

Figure 1:
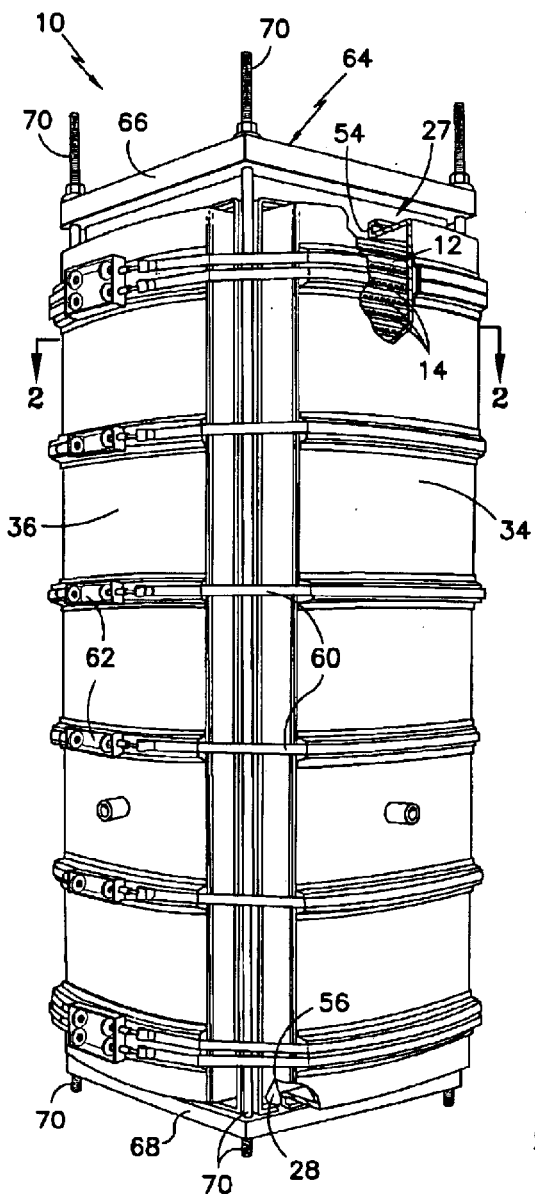
FIG. 1 is a perspective view, partly broken away, showing a fuel cell system of the prior art.
Figure 3:
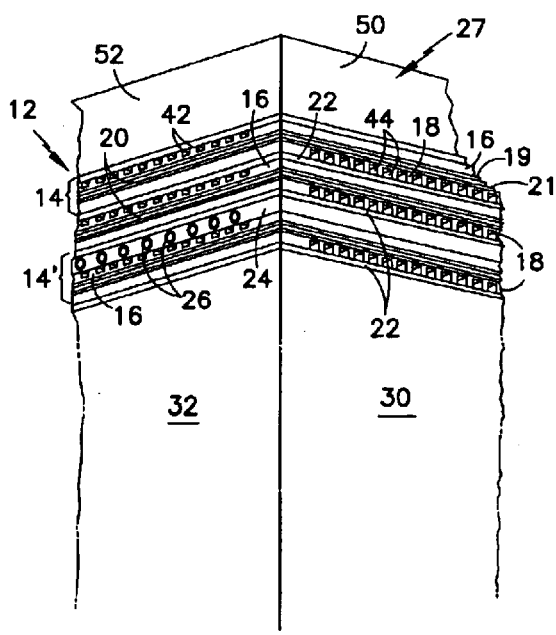
FIG. 3 is a perspective view of a portion of the stack of fuel cells of FIG. 1 with the manifolds and constraint system of FIG. 1 removed.
Figure 2:
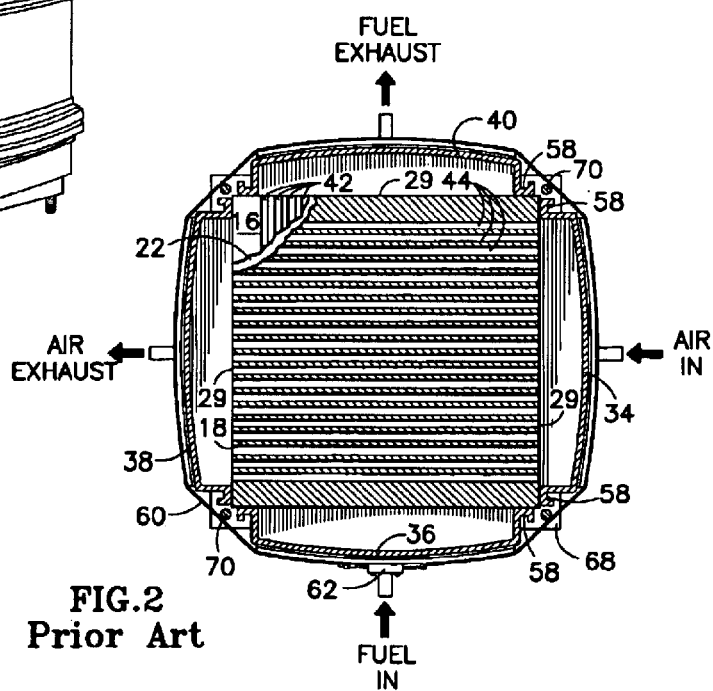
FIG. 2 is a sectional view taken along the line 2—2 in FIG. 1. The section is taken parallel to the plane of the cells, cutting through the reactant gas channels of a cathode electrode.

Referring to FIG. 4, in a system 118 employing fluids, a sleeve manifold 119 according to the invention is adapted to have a stack of cells (of a fuel cell system or electrochemical cell system) 121 inserted therein after which seals or gaskets 122, 123 will be applied to end pieces 124, 125 (such current collecting blocks) of the cell stack 121 and to the end edges 126, 127 of the sleeve manifold 119. Pressure plates (or end plates) 130 and 131 each have a land 132 to receive a respective gasket 122, 123 and the whole assembly 118 will be compressed and then held by tie rods 133 (shown only at the left end) extending outside the sleeve manifold 119, through and between the end plates 130, 131 and secured by nuts (not shown), as is known in the art and shown in FIG. 1. In FIG. 4, the simplified showing of the sleeve manifold 119 is of a hollow rectangular prism, and does not illustrate any manifold chambers, for simplicity. The seals or gaskets may be of an expandable elastomer as disclosed in U.S. Pat. No. 4,774,154.

In preferred use of the invention with fuel cells, electrochemical cells, or enthalpy exchange devices, a sleeve manifold of the present invention includes chambers formed therein as illustrated in FIGS. 5–8, or otherwise. Referring to FIG. 5, the sleeve manifold 119a of the invention is shaped so as to provide a plurality of manifold chambers such as a fuel inlet manifold chamber 134 and a fuel outlet manifold chamber 135; an air inlet manifold chamber 136 and an air outlet chamber manifold 137; a coolant inlet manifold chamber 138 and a coolant outlet manifold chamber 139. In between the chambers 134–139 are portions 142, adapted to contact the cell stack 121, which comprise flat surfaces except that each of the portions 142 has a pair of seals 143, each of which runs the length of the stack to isolate each of the chambers 134–139 from all other ones of the chambers. The seals may be in grooves, and may be round (as shown) or rectangular in cross section. The sleeve manifold 119a may be made of metal, such as steel, as shown, or it may be made of graphite, or of any suitable plastic, or reinforced plastic which is impervious to and compatible with the reactant fluids to be contained thereby. Being gas impervious, the sleeve manifold 119a will absolutely prevent leakage from within one of the chambers 134–139 directly to the outside environment. The only chance for leakage being between each chamber and an adjacent chamber, or from the ends of the chambers, such as at the position of the gaskets 122, 123 in FIG. 4. Leakage between the chambers 134 and 136 is of little consequence since the hydrogen would be burned at the cathode, or the oxygen consumed at the anode, with little effect provided the leakage were small. Leakage of coolant, provided it is deionized water, from either the chamber 138 or the chamber 139 into any of the chambers 134–137 will be of no consequence since water is involved in the process. Leakage of reactant gas into the water channel is of no consequence as well. The embodiment of FIG. 5 may also be used for electrochemical cells and for fuel cells that have internal coolant manifolds.

Figure 6:
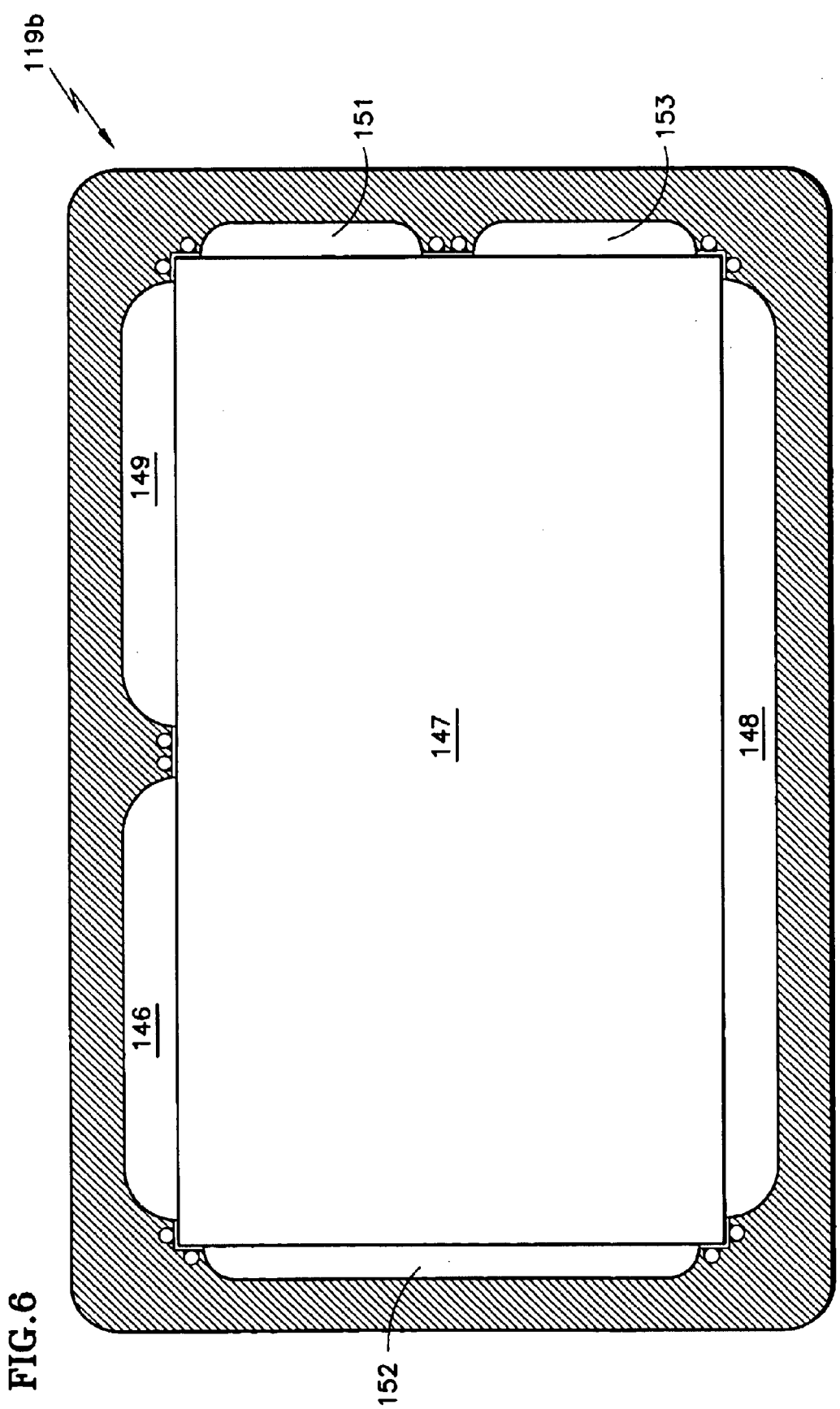
FIG. 6 is an end elevation view of a second embodiment of a sleeve manifold according to the present invention.

An embodiment useful with enthalpy recovery devices, such as that described in U.S. Pat. No. 6,274,259, is shown in FIG. 6. Therein, a sleeve manifold 119b is shaped so as to provide a plurality of manifold chambers, such as a fresh air inlet manifold chamber 146, which will distribute fresh air from a suitable supply, which might be ambient, through channels in the plates of an enthalpy exchange device stack 147, and a fresh air turnaround manifold chamber 148, which turns the air and causes it to flow back through the plates toward a humidified air outlet manifold chamber 149, from which the humidified air may be ducted to the air inlet of a fuel cell for use as oxidant reactant. The sleeve manifold 119b may also include a cathode exhaust inlet manifold chamber 151 which receives oxygen-depleted, warm, humidified air, such as from the cathode exhaust of a fuel cell; an exhaust air turnaround manifold chamber 152 turns the flow of humidified air toward an exhaust air exit manifold chamber 153 from which the air is typically vented to ambient.

Figure 7:
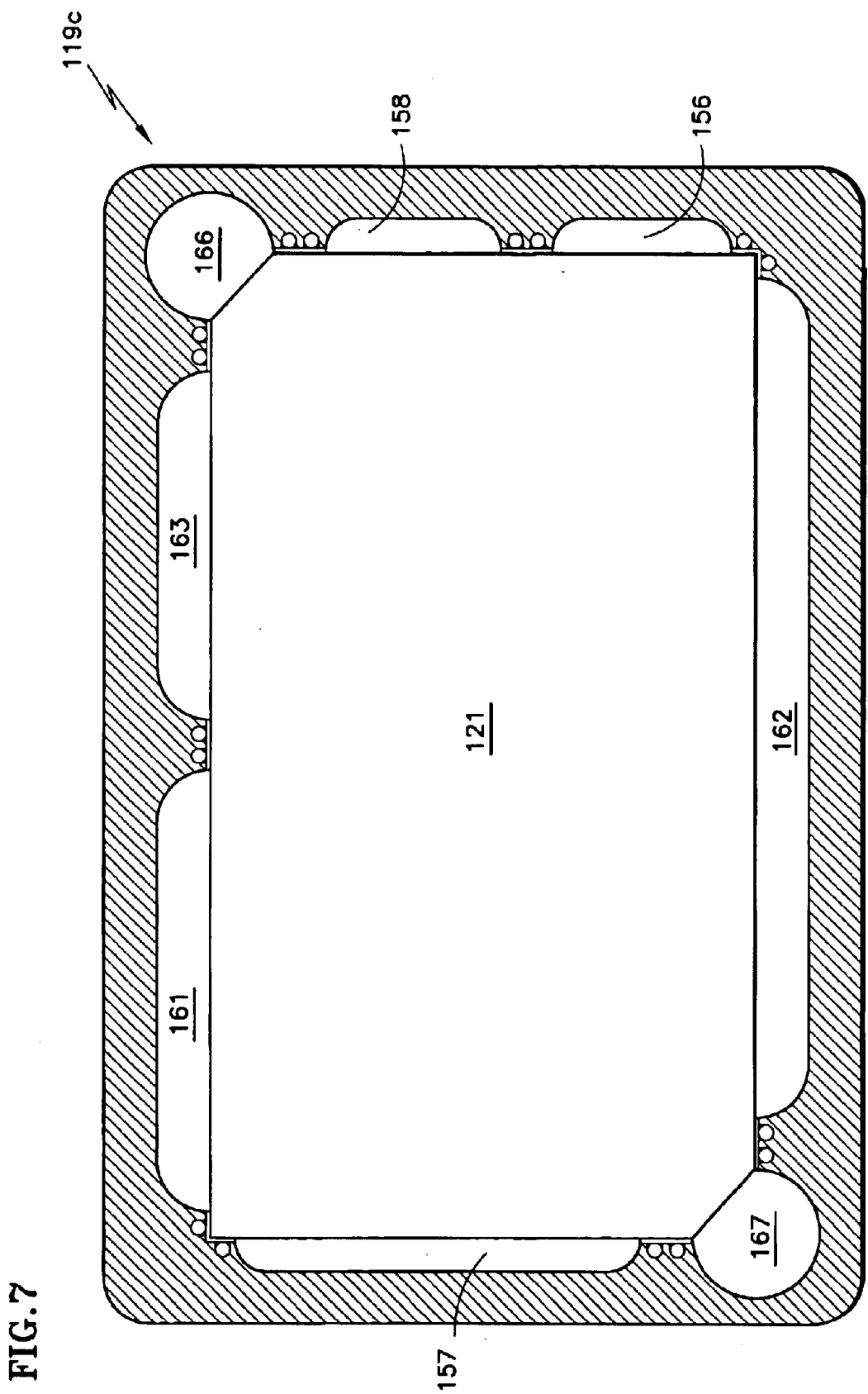
FIG. 7 is an end elevation section of a third embodiment of a sleeve manifold according to the invention.

In FIG. 7, a sleeve manifold well suited for a proton exchange membrane fuel cell includes passages for the reactant gases as well as for coolant. The coolant may be water, a conventional antifreeze, or a direct antifreeze as are known. A fuel inlet manifold chamber 156 directs fuel to a first set of flow field channels (not shown) in the cells of the fuel cell stack 121 which lead the fuel through a fuel turnaround manifold chamber 157 where the fuel flow is turned and directed to those of the fuel flow field channels which will lead the fuel to a fuel exit manifold chamber 158. An oxidant inlet manifold chamber 161 will provide fuel to those of the oxidant flow field channels within the cells of the stack 121 which will lead the oxidant to an oxidant turnaround manifold chamber 162. There, the oxidant flow is turned and directed through those of the oxidant flow field channels in the cells of the stack 121 which lead the oxidant to an oxidant exit manifold chamber 163. A coolant inlet manifold chamber 166 and a coolant exit manifold chamber 167 are provided in the corners of the sleeve manifold. This provides the coldest coolant near the air exit manifold chamber to aid in condensing water out of the air for process water balance in the fuel cell. It also provides lower temperature, a more even temperature profile, a higher coolant exit temperature; it also permits operation with higher air utilization and lower coolant flow, as is disclosed and claimed in commonly owned, copending U.S. patent application Ser. No. 09/948,353, filed Sep. 7, 2001.

Figure 8:
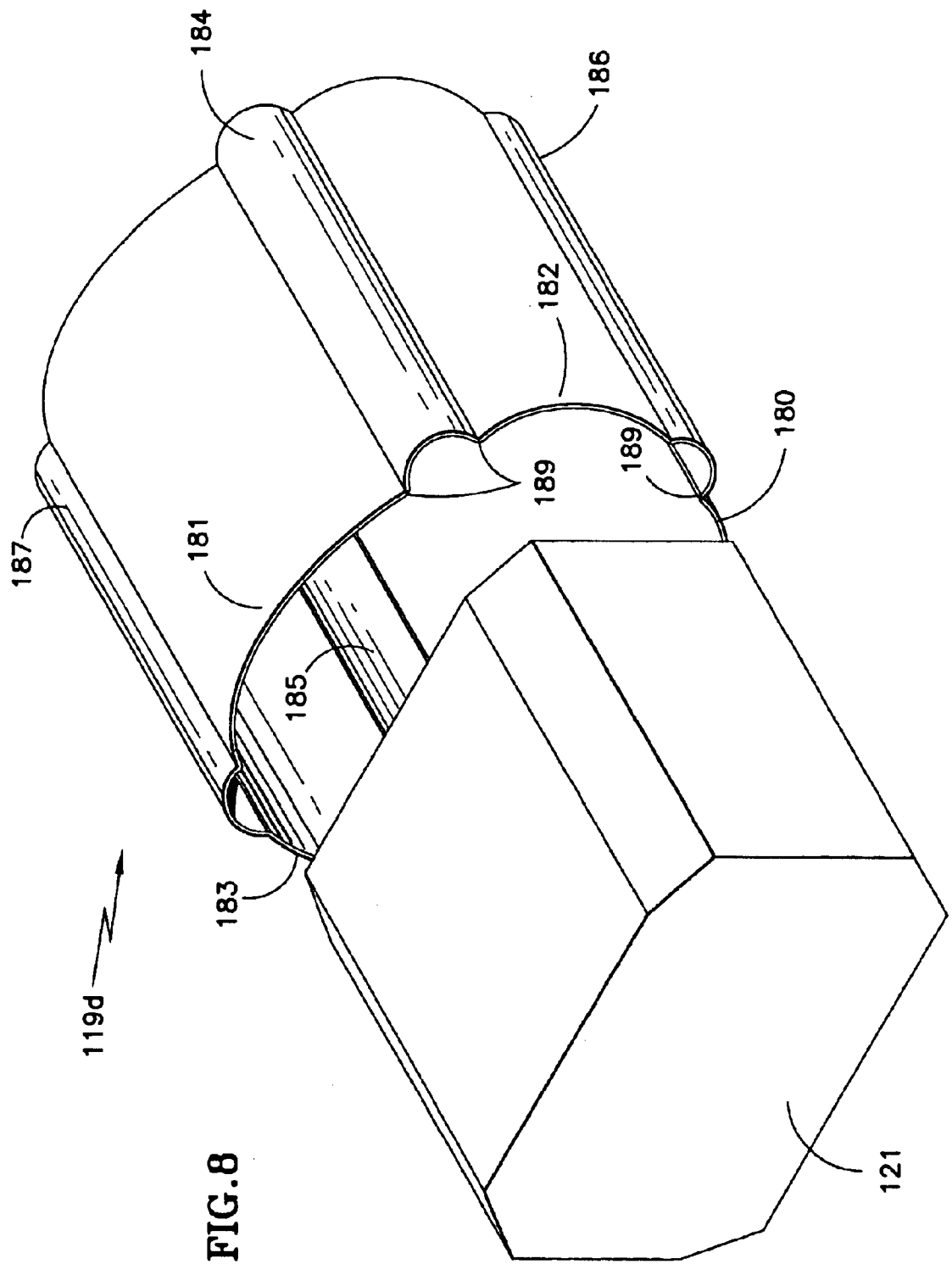
FIG. 8 is a simplified, stylized schematic perspective view of a fourth embodiment of a sleeve manifold according to the invention, disposed with a cell stack.

FIG. 8 is a simplified and stylized representation of a sleeve manifold 119d which is formed of essentially uniform-thickness material, which is generally an oblate cylindroid, shaped to provide eight arches 180–187, each of which will form a chamber with the peripheral surfaces of a cell stack 121 therein, each chamber may serve as an inlet manifold or an outlet manifold in the same fashion as described with respect to FIG. 7. The intersection 189 of each arch 180–187 with the arches adjacent thereto all have flat portions, like the portions 142 in FIG. 5, with one or two seals (like the seals 143) so as to prevent leakage between a channel formed by one of the arches and a channel formed by an adjacent arch. In the embodiment of FIG. 8, there are four arches 184–187 which correspond to the chambers 166, 167 of FIG. 7, which may be used in a PEM, atmospheric fuel cell for water channels, or other coolant channels, that are operated at sub-atmospheric pressures. The sub-atmospheric pressures will draw the between-channel intersections 189 into tight contact with the cell stack 121 so that the seals (like seals 143) will be drawn tightly to the fuel cell stack 121 by atmospheric pressure external thereto.

All of the aforementioned patents and applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A system employing fluids, said system selected from; a fuel cell system for generating electricity from gaseous fuel and gaseous oxidant, an electrochemical cell system for decomposing compounds, and an enthalpy recovery device for transferring heat and moisture from one gas to another, said system comprising:

a stack of contiguous cells or plates having edges which together form peripheral surfaces on a plurality of sides of said stack, said stack including end pieces, each having a first surface contacting one of said cells or plates at a corresponding end of said stack, and having a second surface, opposite said first surface, defining ends of said stack, said ends each having a perimeter;

a one-piece sleeve manifold surrounding said stack from one said ends of said stack to the other said ends of said stack, said sleeve manifold shaped to form a plurality of manifold chambers for directing flow of fluid either into or out of said stack when said stack is disposed within said sleeve manifold, each said chamber being sealed against fluid flow between it and any chamber adjacent to it;

a pair of seals, each seal coextensive and contiguous with the perimeter of one end of said stack;

a pair of pressure plates, each pressure plate contiguous with and extending beyond one of said seals; and means for holding said pressure plates, said seals and said sleeve manifold together so as to seal said sleeve manifold to prevent leakage of fluids therefrom.

2. A system according to claim 1 wherein:

said sleeve manifold is formed of a material of substantially uniform thickness shaped to form said manifold chambers.

3. A system according to claim 1 wherein said sleeve manifold is formed of a material of varying thickness, the variations in thickness forming said manifold chambers.

4. A system according to claim 1 wherein said sleeve manifold comprises metal.

5. A system according to claim 1 wherein said sleeve manifold comprises graphite.

6. A system according to claim 1 wherein said sleeve manifold comprises plastic.

7. A system according to claim 1 wherein said sleeve manifold comprises reinforced plastic.

8. A system according to claim 1 wherein said sleeve manifold is formed by bending, machining, casting or extrusion.

9. A system according to claim 1 wherein said sleeve manifold has elastomeric seals between adjacent ones of said manifold chambers.

10. A system according to claim 1 wherein said sleeve manifold has thermoplastic seals between adjacent ones of said manifold chambers.

11. A system according to claim 1 wherein said system is a fuel cell system and said sleeve manifold is shaped to form oxidant inlet and outlet manifolds, and fuel inlet and outlet manifolds for a fuel cell stack.

12. A system according to claim 11 wherein said sleeve manifold is further shaped to form coolant inlet and outlet manifolds.

13. A system according to claim 1 wherein said system is an electrochemical cell system and said sleeve manifold is shaped to form reactant inlet and product outlet manifolds.

14. A system according to claim 1 wherein said system is an enthalpy exchange device and said sleeve manifold is shaped to form inlet and outlet manifolds for a first stream of warm, moist gas and inlet and outlet manifolds for a second gas stream to which heat and moisture are to be transferred.

15. A system according to claim 1 wherein said means comprises a plurality of tie rods, extending through and between said pressure plates.

* * * * *